Patented Apr. 4, 1950

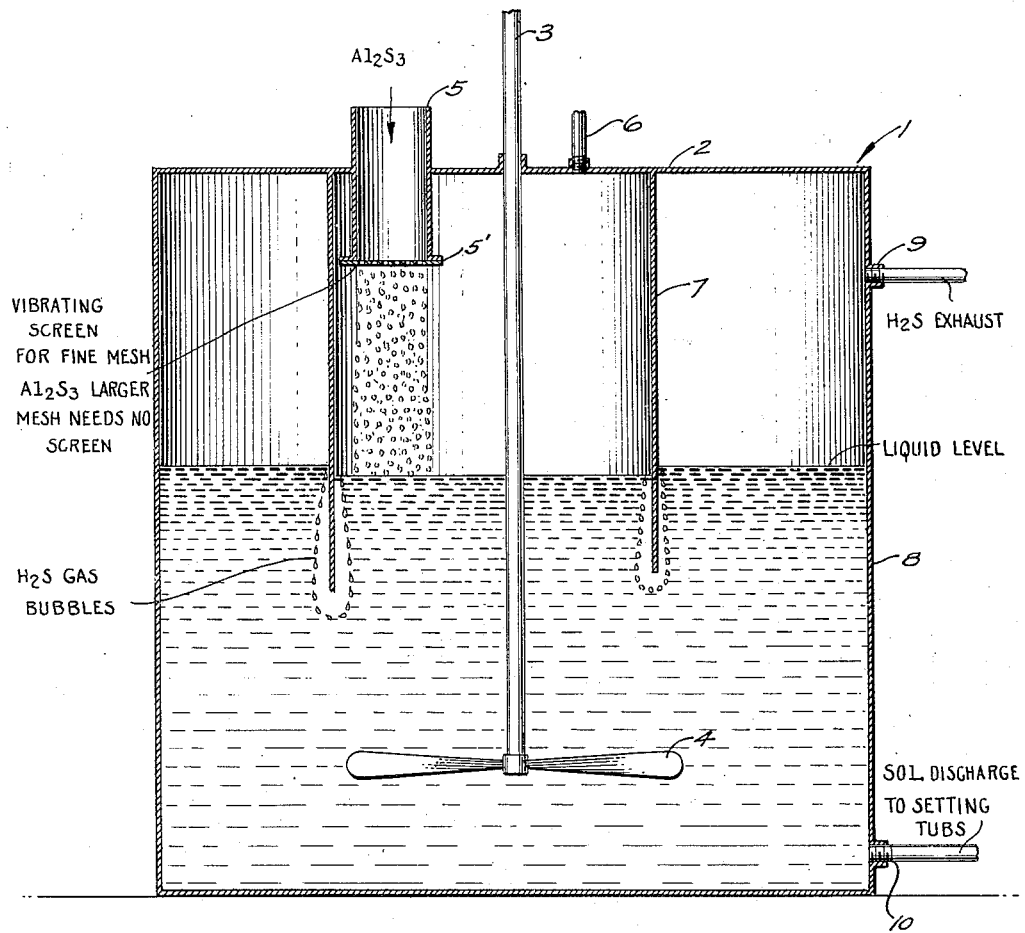

2,503,168

UNITED STATES PATENT OFFICE 2,503,168

METHOD OF PREPARING ALUMINA GEL

Walter A. Patrick, Jr., Mount Washington, Md., assignor to The Davison Chemical Corporation, Baltimore, Md.

Application September 12, 1946, Serial No. 696,595

5 Claims. (Cl. 252—313)

This invention relates to the preparation of gels having high catalytic and adsorptive properties and more especially to the preparation of aluminum oxide sols and gels from aluminum sulfide. This application is a continuation-in-part of my copending application Serial No. 447,419, filed June 17, 1942, abandoned.

The properties of aluminum oxide gels have long been recognized and procedures for the preparation of such gels have been developed.

In many of the prior art processes for the manufacture of aluminum oxide gels extensive washing of the gel is required to remove impurities in order that the product will have the desired properties. This washing step greatly increases the cost of production because of losses in both time and material.

Other processes have been developed in which sols of aluminum oxide are produced directly and which do not require washing of the gelled product. In these processes, however, it is found that the concentration of the aluminum oxide in the sol is so low that considerable concentration must be effected. This likewise increases the cost of production. In the preparation of silica gel, sols of $SiO_2$ having a concentration of 10% may be directly obtained. With known methods of producing aluminum oxide sols directly which do not require washing of the gelled product, the maximum concentration obtainable is 4%. It would seem reasonable that in view of the possibility of obtaining silica sols of 10% concentration that it should likewise be possible to obtain aluminum oxide sols of a somewhat similar concentration.

In some of the processes of preparing aluminum oxide sols directly which do not necessitate washing of the gelled product, reaction products are obtained which are undesirable and the disposal of which is difficult. Also, it is necessary to resort to the use of extraneous materials in some of the processes, which materials are costly and involve further manipulative procedures for their recovery or separation.

The major object of the present invention is to devise a method of preparing aluminum oxide sols and gels in which sols having a high concentration of aluminum oxide may be directly prepared in a manner which will avoid the disadvantages of the prior art as pointed out hereinbefore.

Another object of this invention is to devise a method of preparing aluminum oxide sols and gels in which sols having a concentration of 4 to 16% of aluminum oxide may be directly prepared.

A further object of this invention is to devise a method of preparing aluminum oxide gels in which reaction products capable of being easily disposed of are obtained.

Still another object of this invention is to provide a method of producing gels of aluminum oxide in which sols having a high aluminum oxide content are prepared by the direct reaction between aluminum sulfide and water.

A still further object of this invention is to devise a method of preparing aluminum oxide gels in which sols having a high aluminum oxide content are prepared by reacting finely divided aluminum sulfide with water containing a small amount of a volatile organic acid and in which the hydrogen ion concentration of the reaction mass and the temperature thereof are controlled to produce optimum results.

Among other objects of this invention is an aluminum oxide sol which in unconcentrated form has an aluminum oxide content of about 4 to 16%.

With these and other objects in view which will appear more fully hereinafter, the invention resides in the product and the method of preparing the same as hereinafter set forth.

In order to more fully illustrate the present invention, there is shown in the single figure of the accompanying drawings a diagrammatical arrangement of apparatus suitable for carrying out the process.

In accordance with the present invention, it has been found that by mixing aluminum sulfide ($Al_2S_3$) with water, reaction occurs which results in the liberation of hydrogen sulfide and the formation of a sol of aluminum oxide. While an exothermic reaction between aluminum sulfide and water will take place under most conditions, when the aluminum sulfide is in very finely divided form and the water is slightly acidulated with a weak volatile organic acid such as acetic acid, a rapid reaction takes place liberating the hydrogen sulfide and forming as a residual product a sol of aluminum oxide.

More particularly, it has been found in accordance with this invention that a sol containing a high concentration of aluminum oxide can be obtained by mixing aluminum sulfide ($Al_2S_3$) with water, without the necessity of concentrating the sol. During the resulting reaction, hydrogen sulfide is liberated with the formation of a sol of aluminum oxide. From this sol a suitable gel can be obtained which may be used without washing. A reaction between aluminum sulfide and water will take place under any conditions and very violently if a large quantity of the former is dropped in the latter. When the aluminum sulfide is added slowly and with violent agitation to water slightly acidulated with a weak volatile organic acid such as for instance acetic acid or formic acid, a smooth reaction occurs liberating the hydrogen sulfide and forming as a residual product a sol of aluminum oxide. Upon standing over a period of time, the length of time depending on the concentration of alumina in the final mix, the sol will set and become a vibrant gel.

The physical character of the hydrogel produced from the hydrosol depends upon a number of factors. For instance, by using varying screen sizes of aluminum sulfide as a starting material, the physical character of the final gel may be substantially altered. By using an aluminum sulfide of thru a #60 U. S. standard screen, a dark visibly porous gel is obtained. As the size of the aluminum sulfide is increased to say

30 U. S. standard screen, the gel becomes lighter in color and translucent. The gel produced from the latter size is not porous in the sense that pores are visible, but is a smooth material that resembles silica gel in appearance. The screen sizes mentioned are not intended as limitation but merely for illustration. Other sizes of aluminum sulfide will produce gels which are also very satisfactory.

The physical character of the hydrogel depends on the concentration of the alumina. If the concentration is high, say 10–16% $Al_2O_3$, the gel will be brittle and will break easily. However, on the lower end of the scale, say 3–4% $Al_2O_3$, the gel will be weak and scarcely be strong enough to support its own weight. The tendency is for the weak gels to synerese. For example, a 3% alumina hydrogel on standing for several days gradually assumed the shape of the containing vessel and the liquid of syneresis remained on the surface in the amount of about 5% of the hydrogel volume.

After the reaction between the aluminum sulfide and acid solution is completed, the hydrogen sulfide may be removed by one of two methods. The first is to reduce the pressure above the alumina hydrosol immediately upon completion of the reaction. This may be done in the laboratory by placing the hydrosol in a suction flask, sealing all openings except one which can be attached to a water aspirator. A second method of hydrogen sulfide removal is that which is incidental to the drying operation.

After the mixing of the hydrosol, the sol is allowed to set in suitable containers. After it has become hard to such an extent as will permit ease of handling, the gel is removed, broken into fragments if desired and dried. During the drying operation, the gels containing a low percentage of alumina, less than 7–8% will revert to the hydrosol stage thus permitting the hydrogen sulfide to escape and be collected. However, the gels which contain a larger percentage of alumina (8–16%) will not revert, but remain in the solid state. The hydrogen sulfide which has remained in the gel will escape but the gel will be in a porous or granular state. This is caused by the partial escape of the hydrogen sulfide during the setting period of the gel. The gas forms small pockets in the semi-plastic gel and these remain in the final material although smaller in size due to shrinkage.

In the accompanying drawings, there is shown diagrammatically an apparatus suitable for carrying out a process embodying the present invention. This apparatus comprises a reaction vessel generally indicated by the numeral 1 provided with a cover member 2. A stirring mechanism 3 is journalled in the cover 2 and extends vertically into the vessel to a point well below the liquid level. The lower extremity of this stirring mechanism is provided with suitable blades 4 for agitating the liquid and the upper end is connected to a source of power (not shown) for rotating the mechanism.

A feed conduit 5 for introducing aluminum sulfide into the vessel and a water inlet 6 also project through the cover 2. A vibrating screen 5′ may be placed in the feed conduit if the use of aluminum sulfide of fine mesh is contemplated to obtain a sol of the desired characteristics.

A tube 7 of substantial diameter is also carried by the cover member 2 and depends vertically a substantial distance into the vessel beneath the surface of liquid therein.

The side wall 8 of the vessel 1 is also provided with a pair of threaded ports, one of which is above and the other below the liquid level. The ports communicate with a hydrogen sulfide exhaust pipe 9 and a sol discharge pipe 10 respectively. If desired, the hydrogen sulfide exhaust pipe may include a suitable exhaust pump or equivalent device.

In practice, the vessel 1 is filled to a predetermined level above the lower end of the tube 7 preparatory to the addition of the aluminum sulfide and the agitator mechanism started. Aluminum sulfide is then added through the feed chute 5 and sufficient additional water is continuously added to maintain the reaction.

As previously set forth, the particle size of the aluminum sulfide will depend upon the desired characteristics of the end product. If a small particle size is used, a screen is positioned in the conduit 5.

Preferably, the water is acidulated by the addition of a volatile organic acid such as acetic or formic acid. Sufficient acid is added to the water before it is introduced to the vessel to make the water slightly acid. However, unacidulated water can be used if desired.

It has been found that the reaction will proceed satisfactorily within a range above 0° C. and below 80° C. and temperatures within this range do not substantially effect the physical character of the hydrosol. Temperatures in the higher range can be obtained by adding preheated water to the vessel 1 or using a vessel having a heated jacket.

The reaction takes place within the cylinder 7 and the resulting release of hydrogen sulfide gas increases the pressure within the cylinder thereby lowering the level of the liquid mixture in the manner indicated in the drawings. This pressure forces the liberated hydrogen sulfide gas through the liquid from which it escapes after passing through the open end of the cylinder 7. It then leaves the vessel through the exhaust pipe 9.

As the hydrosol settles to the bottom of the vessel, it is withdrawn through the discharge pipe 10. This provides a continuous process.

This product is an aluminum oxide sol having an aluminum oxide content of from 4–16% which does not require further concentration. After it is withdrawn from the vessel, it is allowed to set or gel. The so-formed hydrogel may be treated by dehydration to form a highly glassy transparent heat stable gel which has exceedingly fine capillaries therein. As before stated, the residual hydrogen sulfide will escape during the drying operation from hydrogel containing a low percentage of aluminum, less than 7–8%, before the hydrosol has hardened, thereby reducing the porosity of the final product. In hydrosols containing a higher percentage of aluminum oxide, the hydrogen sulfide escapes after the material has partly gelled, thereby causing the product to be in a more porous or granular state.

The escape of this gaseous by-product makes it unnecessary to wash the aluminum oxide hydrogel. Moreover, because of the high aluminum oxide content of the sol obtained in the outlined procedure, the time required for the dehydration of the hydrogel produced from the high alumina sol to form the desired gel is materially reduced thereby effecting an obvious economy.

The extremely small amount of acid which is introduced, if an acidulated water is used, into the reaction, is retained in the sol and is not found to be objectionable. As a matter of fact, it is believed that when acetic or other organic acids are used, the retention of a small amount of the acid in the form of aluminum acetate or similar aluminum compound performs a function in the maintenance of the stability of the material. It should also be noted that the small quantity of acid used does not result in the introduction of objectionable electrolytes into the solution. This is important because aluminum oxide sols are coagulated by electrolytes in solution.

The following examples are given as illustrative of processes embodying the present invention:

*Example 1*

The following illustration will serve to demonstrate this invention using acetic acid.

An acetic acid solution was made up which contained 902 mls. of water and 38.4 mls. of glacial acetic acid. An agitator was so arranged as to violently stir the solution while the aluminum sulfide was being added. The aluminum sulfide was ground so that 100% of it would pass through a 100 mesh U. S. screen. A vibrating screen was so arranged that the aluminum sulfide would sift through into the agitated liquid below. One hundred and thirty-five grams of aluminum sulfide was added over a period of two hours which gave a sol containing about 9% $Al_2O_3$. This mix set in a few minutes and upon drying yielded a gel which was porous in structure.

When activated at 825° F. for 1 hour the water vapor adsorption at different relative humidities at 80° F. were as follows:

At 10% R. H., 9.95% water vapor adsorption
At 20% R. H., 13.62% water vapor adsorption
At 40% R. H., 19.50% water vapor adsorption
At 60% R. H., 28.80% water vapor adsorption
At 80% R. H., 53.87% water vapor adsorption
At 100% R. H., 57.21% water vapor adsorption

*Example 2*

To illustrate the use of formic acid the following example is given:

Two and six tenths ml. of 90% formic acid was made up with water to a total of four hundred and seventy ml. which corresponds roughly to one half percent solution. To this was added powdered aluminum sulfide in such an amount as to give a calculated 11.5% aluminum oxide in the hydrosol. The aluminum sulfide was added over a period of one and one half hours through a vibrating screen. The resulting hydrosol set and upon drying and activating one hour at 825° F. adsorbed water vapor as follows:

| Relative Humidity at 80° F. | Moisture Pick Up |
|---|---|
| Per cent | Per cent |
| 10 | 8.58 |
| 40 | 15.32 |
| 100 | 42.18 |

In all of the examples, the procedures were carried out with ingredients initially at room temperature.

In either of the illustrated processes, aluminum oxide sol containing a high percentage, (4–16%) aluminum oxide can be obtained. The process proceeds rapidly but is readily controlled by constant agitation of the solution and the use of acidulated water. While the mere mixing of aluminum sulfide with water at any temperature will produce an alumina sol, the above-described controls, together with control of the particle size, enable optimum results to be obtained. A washing of the gel produced from the hydrosol is, of course, unnecessary.

While for purposes of illustrating the invention only one type of apparatus and two detailed processes have been disclosed, it is to be understood that other types of apparatus and processes within the limits set forth in the present specification may be provided by those skilled in the art without departing from the concept of the present invention.

I claim:

1. A method of manufacturing an aluminum oxide sol comprising mixing aluminum sulfide with water at a temperature ranging from about 0° C. to about 80° C., and adding appreciable quantities of a volatile organic acid from the group consisting of acetic acid and formic acid, said acid not exceeding an amount sufficient to form a solution about 1.0 N in acidity.

2. A method of making an aluminum oxide sol comprising mixing aluminum sulfide with water at a temperature ranging from about 0° C. to about 80° C., and adding appreciable quantities of acid to the mixture, said acid concentration in the mixture not exceeding about 1.0 N, said aluminum sulfide and water being mixed in quantities to form a sol of 4% to 16% alumina.

3. A method of making an aluminum oxide gel substantially free of water soluble salts comprising mixing aluminum sulfide with water slightly acidulated with a volatile organic acid from the group consisting of acetic acid and formic acid at a temperature ranging from about 0° C. to about 80° C., removing the hydrogen sulfide formed during the mixing from the mixture, and gelling the sol, said water having an acid concentration not over about 1.0 N.

4. A method of making an aluminum oxide sol substantially free of water soluble salts comprising mixing aluminum sulfide with water slightly acidulated with acetic acid in the temperature in the range of about 0° C. to about 80° C., said acetic acid concentration in the mixture not exceeding about 1.0 N, said aluminum sulfide and water being mixed in quantities to form a sol of 4% to 16% alumina.

5. A method of making an aluminum oxide sol substantially free of water soluble salts comprising mixing aluminum sulfide with water slightly acidulated with formic acid at a temperature ranging from about 0° C. to about 80° C., said formic acid concentration in the mixture not exceeding about 1.0 N, said aluminum sulfide and water being mixed in quantities to form a sol of 4% to 16% alumina.

WALTER A. PATRICK, Jr.

REFERENCES CITED

The following references are of record in the file of this patent:

UNITED STATES PATENTS

| Number | Name | Date |
|---|---|---|
| 1,569,483 | Haglund | Jan. 12, 1926 |
| 1,719,131 | Ridgeway et al. | July 2, 1929 |
| 1,797,655 | Haglund | Mar. 24, 1931 |
| 1,857,844 | Haglund | Mar. 10, 1932 |
| 1,935,178 | Connolly | Nov. 14, 1933 |

OTHER REFERENCES

Mellor, "Inorg. and Theor. Chem.," vol. V, (1924) pp. 282, 330–331.